United States Patent [19]

Kanazawa et al.

[11] 4,453,615
[45] Jun. 12, 1984

[54] POWER STEERING SYSTEM FOR ROAD VEHICLES

[75] Inventors: Hirotaka Kanazawa; Takeshi Tanaka, both of Hiroshima; Michio Abe; Naoyuki Maeda, both of Kasugai, all of Japan

[73] Assignees: Toyo Kogyo Co., Ltd., Hiroshima; Tokai TRW & Co., Ltd., Kasugai, both of Japan

[21] Appl. No.: 384,242

[22] Filed: Jun. 2, 1982

[30] Foreign Application Priority Data

Jun. 3, 1981 [JP] Japan ................................ 56-86287

[51] Int. Cl.³ ............................................. B62D 5/06
[52] U.S. Cl. .................................................. 180/142
[58] Field of Search ............... 180/143, 142, 141, 132

[56] References Cited

U.S. PATENT DOCUMENTS

| | | | |
|---|---|---|---|
| 2,356,492 | 8/1944 | Smith | 180/142 |
| 2,487,618 | 11/1949 | Twyman | 180/143 |
| 3,424,262 | 1/1969 | Kunz | 180/133 |
| 3,693,747 | 9/1972 | Nishikawa | 180/143 |
| 3,924,705 | 12/1975 | Sugisawa | 180/143 |
| 3,991,846 | 11/1976 | Chichester et al. | 180/132 |
| 4,008,779 | 2/1977 | Shinoda | 180/141 X |
| 4,216,841 | 8/1980 | Ohtuka et al. | 180/141 |
| 4,300,650 | 11/1981 | Weber | 180/143 X |

FOREIGN PATENT DOCUMENTS

| | | | |
|---|---|---|---|
| 55-34930 | 3/1980 | Japan. | |
| 1499273 | 1/1978 | United Kingdom | 180/143 |

*Primary Examiner*—John A. Pekar
*Attorney, Agent, or Firm*—Fleit, Jacobson, Cohn & Price

[57] ABSTRACT

A power steering system including a power cylinder and a hydraulic pump for supplying a hydraulic pressure to the power cylinder through a control valve to produce a hydraulic assisting force. A control device is provided to drive the hydraulic pump only when one or both of the vehicle power clutch disconnecting member and the brake actuating member are actuated under a vehicle speed lower than a predetermined value.

7 Claims, 5 Drawing Figures

POWER STEERING SYSTEM FOR ROAD VEHICLES

The present invention relates to a steering system for road vehicles and more particularly to a power steering system for road vehicles.

In road vehicles such as automobiles, there are increasing tendencies of adopting power steering systems to provide the drivers with ready controllability with less efforts. Conventional power steering systems include a hydraulic pump adapted to be driven by the vehicle engine or an electric motor to provide a supply of pressurized hydraulic fluid and a power cylinder adapted for producing an assisting force under hydraulic pressure so that the driver's steering efforts are assisted hydraulically. Such conventional power steering systems have been so designed that the assisting force is produced throughout the operation of the vehicle. Such conventional steering systems are however disadvantageous in respect of economics since the hydraulic pump is driven even when the vehicle is running on a straight path or stopped on a traffic signal. Further, in an arrangement wherein the hydraulic pump is driven by an electric motor, a continuous operation of the motor may produce an electric power which has an adverse effect on the life of the motor. Therefore, such continuous operation of the motor leads to an over-discharge of the battery in addition to a power loss due to unnecessary operation of the motor.

In view of the above problems, the U.S. Pat. No. 3,991,846 proposes to operate the pump driving motor only in response to steering commands and in accordance with the driver's demand for rate of change and total change in the steering angle. The British Pat. No. 1,499,273 and Japanese laid-open utility model No. 55-34930 propose to operate the pump driving motor only under a low vehicle speed. However, none of these proposals satisfactorily solves the problems because they do not teach effective means for detecting the demand for power assistance in steering operation.

It is therefore an object of the present invention to provide a vehicle power steering system in which pump driving motor is operated only when it is required.

Another object of the present invention is to provide a power steering system in which pump driving motor is operated only under a condition wherein a high steering force is required.

A further object of the present invention is to provide a power steering system in which the operation of the pump driving motor can be minimized.

According to the present invention, the above and other objects can be accomplished by a vehicle power steering system comprising hydraulic pump means, driving means for driving the hydraulic pump means, power cylinder means adapted to be connected with said hydraulic pump means so as to be supplied with pressurized hydraulic fluid for providing an assisting steering force, means for detecting operation of at least one of vehicle power clutch disconnecting means and vehicle brake means, time means for actuating said driving means for a predetermined time period when said operation is detected to thereby operate the hydraulic pump means.

The present invention thus detects actuation of the vehicle power clutch disconnecting means or the vehicle brake means as representing an operating condition wherein a high steering force is required and provides a hydraulic assisting force to assist the steering effort by the driver. According to a preferable aspect of the present invention, the power steering system further includes vehicle speed detecting means so that operation of the hydraulic pump means is prohibited when the vehicle speed is above a predetermined value.

The above and other objects and features of the present invention will become apparent from the following descriptions of preferred embodiments taking reference to the accompanying drawings, in which.

Figure 1:
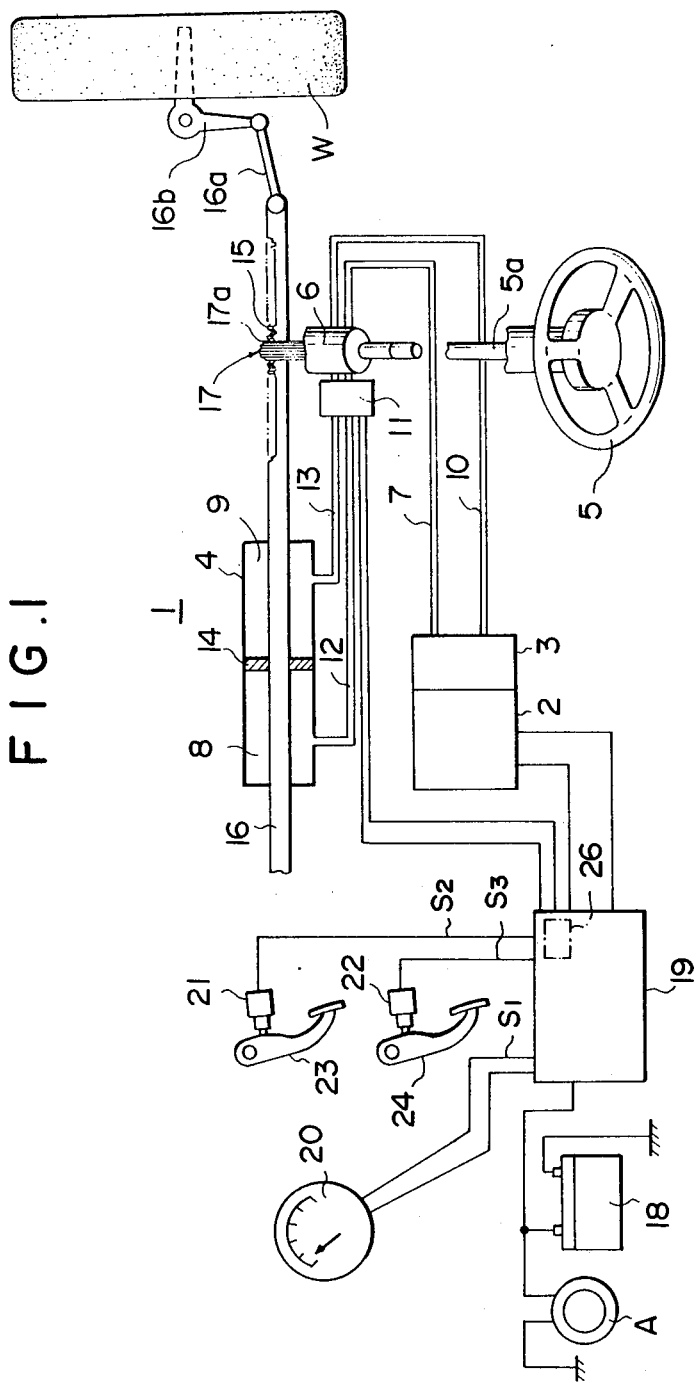
FIG. 1 is a diagrammatical illustration of a vehicle steering system in accordance with one embodiment of the present invention.

Referring now to the drawings, particularly to FIG. 1, there is shown a steering system 1 including a steering wheel 5 provided at one end of a steering shaft 5a. The other end of the steering shaft 5a is connected with a pinion shaft 17 which is formed with pinion teeth 17a. The steering system 1 further includes a transversely extending rack shaft 16 which has rack teeth 15 adapted to be engaged with the pinion teeth 17a on the pinion shaft 17. The rack shaft 16 has one end connected with a tie rod 16a which is in turn connected with a steering knucle arm 16b of a wheel assembly W. Although not shown in the drawings, the other end of the rack shaft 16 is also connected in the same manner with another wheel assembly. Thus, a rotation of the steering wheel 5 causes steering movements of the wheel assemblies W.

In order to provide a hydraulic steering force, the rack shaft 16 has a piston 14 which is secured thereto in an appropriate manner. The piston 14 is disposed in a power cylinder 4 for axial reciprocating movement. The power cylinder 4 is mounted on a stationary part of the vehicle and has a pair of pressure chambers 8 and 9 separated by the piston 14. Pressure chambers 8 and 9 are connected respectively through conduits 12 and 13 with a steering control valve 6 provided on the pinion shaft 17. For providing a hydraulic pressure to the control valve 6, there is provided a hydraulic pump 3 which is driven by an electric motor 2. The pump 3 has an outlet and scavenging ports which are respectively connected through conduits 7 and 10 with the control valve 6.

Figure 3:
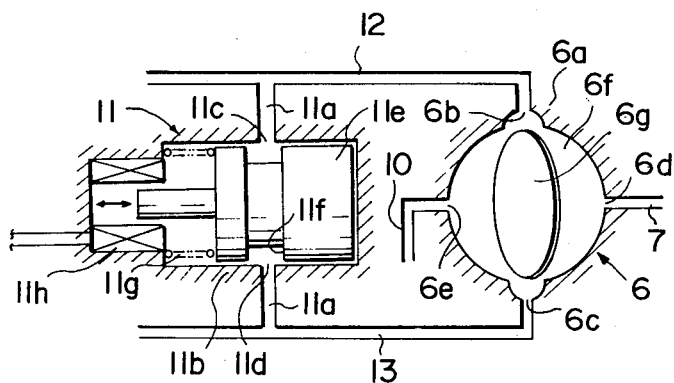
FIG. 3 is a sectional view of the bypass valve used in the steering system shown in FIG. 1.

Referring specifically to FIG. 3, the control valve 6 has a valve housing 6a formed with a pair of diametrically opposite ports 6b and 6c respectively connected with the conduits 12 and 13 leading to the pressure chambers 8 and 9. The housing 6a is further formed with a pair of diametrically opposite ports 6d and 6e which are respectively connected with the conduits 7 and 10 leading to the outlet and scavenging ports of the hydraulic pump 3. In the valve housing 6a, there is defined a circular valve chamber 6f and a valve member 6g of an oval cross-sectional configuration is disposed in the valve chamber 6f. The valve member 6g is connected with the pinion shaft 17 and normally positioned in the valve chamber 6f with its opposite end portions of the cross-section opposed to the ports 6b and 6c. When a hydraulic pressure is applied through the conduit 7 to the port 6d, therefore, the pressure is transmitted equally through the ports 6b and 6c to the conduits 12 and 13 as far as the valve member 6g and the pinion shaft 17 are in the neutral position. However, when the pinion shaft 17 is rotated for example clockwise, the valve member 6g is also rotated in the same direction connecting the port 6c with the pressure line 7 and the port 6b with the scavenge line 10. Thus, the hydraulic pressure is applied to the pressure chamber 9 to produce a hydraulic assisting force.

Between the conduits 12 and 13 leading respectively to the pressure chambers 8 and 9, there is a bypass line 11a provided with a solenoid type bypass valve 11. The bypass valve 11 includes a valve housing 11b having a pair of ports 11c and 11d respectively connected through the line 11a with the conduits 12 and 13. In the housing 11b, there is an axially slidable valve member 11e having an annular groove 11f. The valve member 11e is axially biased by a spring 11g so that it is maintained in a position wherein the annular groove 11f is aligned with the ports 11c and 11d. In this position of the valve member 11e, the conduits 12 and 13 are connected together so that the piston 14 and therefore the rack shaft 16 can be freely moved. The bypass valve 11 is further provided with a solenoid 11h which, when energized, serves to shift the valve member 11e to a position where it blocks the ports 11c and 11d. In this position of the valve member 11e, the conduits 12 and 13 are separated from each other so that the aforementioned hydraulic assisting force is produced in response to a rotation of the valve member 6f.

In order to provide a supply of electric current to the motor 2 and also to the solenoid valve 11, there is provided a controller 19 which receives an electric power supply from a battery 18 and an alternator A. There is further provided a vehicle speed detector 20 which has an output connected with the controller 19.

An output signal $S_1$ is produced by the speed detector 20 when the vehicle speed exceeds a predetermined value, for example, 5 to 25 km/h. The vehicle has a clutch pedal 23 for disconnecting a vehicle power clutch (not shown) which is provided between an engine output shaft and a transmission as well known in the art. The clutch pedal 23 is associated with a switch 21 which is adapted to be closed when the pedal 23 is depressed to thereby produce an output signal $S_2$. The vehicle further has a brake actuating pedal 24 which is associated with a switch 22 adapted to be closed when the pedal 24 is depressed to thereby produce an output signal $S_3$.

Figure 2:
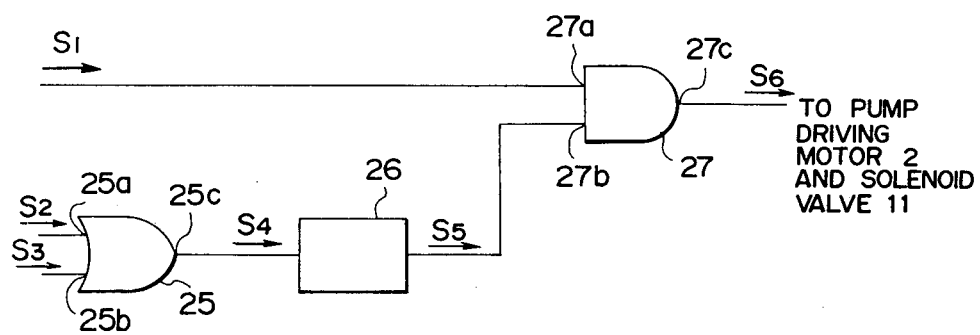
FIG. 2 is a diagram showing a circuit in the motor controller.

FIG. 2 shows the circuit in the controller 19. As shown, the signal $S_1$ from the speed detector 20 is applied to the input 27a and an AND circuit 27. The signal $S_2$ and $S_3$ from the switches 21 and 22 are respectively applied to input terminals 25a and 25b of an OR circuit 25 which has an output terminal 25c connected with a timer circuit 26. The output of the timer circuit 26 is connected with an input terminal 27b of the AND circuit 27. The AND circuit 27 has an output terminal 27a connected with the motor 2 and the solenoid 11h of the valve 11.

In operation, when the pedals 23 and 24 are not depressed, the switches 21 and 22 are opened so that signals $S_2$ and $S_3$ are not produced. Thus, the AND circuit 27 does not produce an output. In this condition, therefore, the motor 2 and the pump 3 are stopped and the solenoid valve 11 is de-energized. Thus, hydraulic pressure is not supplied to the port 6d of the control valve 6 and the conduits 12 and 13 are connected together through the bypass valve 11 in the line 11a. The rack shaft 16 can therefore be moved.

When one or both of the clutch pedal 23 and the brake pedal 24 are depressed, an output signal $S_4$ is produced in the OR circuit 25 and an output $S_5$ is produced at the circuit 26. The output $S_5$ of the circuit 26 is continuously produced for a predetermined period, for example, 5 seconds to 3 minutes, after the pedal is released. The circuit 26 is of a retrigger type so that, if one of the pedals 23 and 24 is depressed again during the time period when the output $S_5$ is being produced, the circuit 26 is reset and the predetermined time period runs from the instance when the pedal is released again. The output $S_5$ of the timer circuit 26 is applied to the AND circuit 27. If the vehicle speed is below the aforementioned predetermined value at this moment, the signal $S_4$ is applied to the AND circuit 27 so that an output $S_6$ is produced. Thus, the motor 2 is energized to drive the hydraulic motor 3 and the solenoid valve 11 is actuated to separate the conduits 12 and 13. Therefore, it becomes possible to produce a hydraulic assisting force in response to an actuation of the steering wheel 5.

Figure 4:
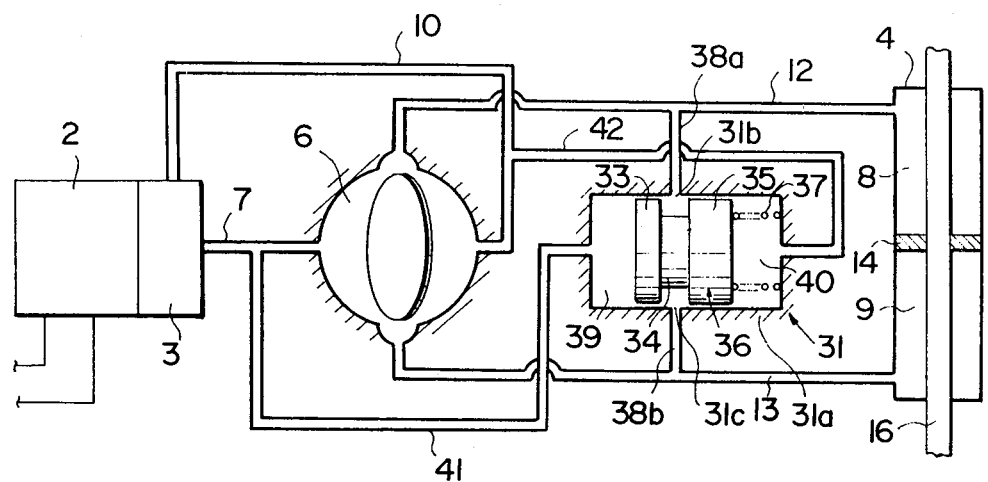
FIG. 4 is a diagrammatical illustration of a vehicle steering system in accordance with another embodiment of the present invention; and, FIG. 5 shows a further embodiment of the present invention.

Referring to FIG. 4, there is shown another embodiment of the present invention. In this embodiment, the solenoid type bypass valve 11 is substituted by a pilot type bypass valve 31. In other respects, the arrangements are the same as in the previous embodiment so that corresponding parts are shown by the same reference characters. In this embodiment, the bypass valve 31 includes a valve housing 31a having a pair of ports 31b and 31c respectively connected through bypass lines 38a and 38b with the conduits 12 and 13. In the housing 31a, there is disposed a valve member 36 having a pair of lands 33 and 35 separated by an annular groove 34. In the housing 31a, there are defined a pair of chambers 39 and 40 at the opposite ends of the valve member 36. The chamber 39 is connected through a conduit 41 with the pressure line 7 and the chamber 40 through a conduit 42 with the pressure line 10. In the chamber 40, there is a spring 37 which biases the valve member 36 to a position where the annular groove 34 is aligned with the ports 31b and 31c. When a hydraulic pressure is introduced into the chamber 39, the valve member 36 is shifted against the action of the spring 37 to block the ports 31b and 31c. Thus, when the hydraulic pump 3 is not in operation, the conduits 12 and 13 are connected together allowing a free movement of the piston 14. When the hydraulic pump 3 is driven by the pump 3, hydraulic pressure is introduced into the chamber 39 to shift the valve member 36 against the action of the spring 37 so that the conduits 12 and 13 are separated. Therefore, it becomes possible to produce a hydraulic assisting force in response to a rotation of the steering wheel.

Figure 5:
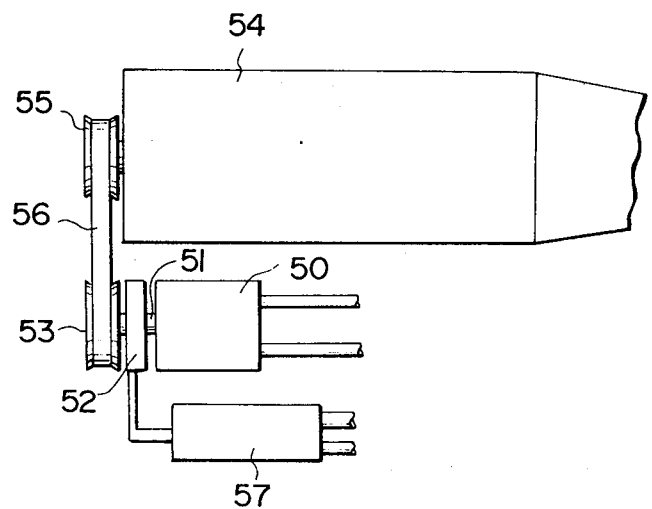

Referring now to FIG. 5, the embodiment shown therein includes a hydraulic pump 50 having a driving shaft 51 connected through a clutch 52 with a driven pulley 53. The vehicle engine 54 has a driving pulley 55 which is connected through a V-belt 56 with the driven pulley 53. The clutch 52 is of a solenoid powder type and controlled by an electric current supplied from a controller 57 which may be of a similar type to the controller 19 in the previous embodiment. Thus, the clutch 52 is connected when either one or both of the clutch pedal and the brake pedal are depressed under a vehicle speed lower than a predetermined value. It should of course be noted that the hydraulic motor may be driven irrespective of the vehicle speed because a hydraulic assisting force may be desirable even under a high vehicle speed. Further, in a vehicle having an automatic transmission, the operation of the hydraulic pump may be controlled only by an actuation of the brake pedal.

The invention has thus been shown and described with reference to specific embodiments, However, it should be noted that the invention is in no way limited to the details of the illustrated arrangements but changes and modifications may be made without departing from the scope of the appended claims.

What is claimed is:

1. A vehicle power steering system comprising hydraulic pump means, driving means for driving the hydraulic pump means, power cylinder means adapted to be connected with said hydraulic pump means so as to be supplied with pressurized hydraulic fluid for providing an assisting steering force, means for detecting operation of at least one of a vehicle power clutch disconnecting means and a vehicle brake means, and control means responsive to said detecting means for actuating said driving means for a predetermined time when said operation is detected to thereby operate the hydraulic pump means.

2. A vehicle power steering system in accordance with claim 1 which further includes vehicle speed detecting means for producing an output when the vehicle speed is below a predetermined value, said control means being responsive both to an output of the detecting means and to the output of the speed detecting means to actuate said driving means when both of the outputs are received.

3. A vehicle power steering system in accordance with claim 1 in which said driving means includes electric motor means and said control means includes switch means for connecting a power supply line to said motor means.

4. A vehicle power steering system in accordance with claim 1 in which said driving means includes clutch means connecting a vehicle engine with the pump means.

5. A vehicle power steering system comprising hydraulic pump means, driving means for driving the hydraulic pump means, power cylinder means adapted to be connected with said hydraulic pump means so as to be supplied with pressurized hydraulic fluid for providing an assisting steering force, means for detecting operation of a vehicle power clutch disconnecting means, and control means responsive to an output of the detecting means to actuate said driving means for a predetermined time period to thereby operate the hydraulic pump means.

6. A vehicle power steering system comprising hydraulic pump means, driving means for driving the hydraulic pump means, power cylinder means adapted to be connected with said hydraulic pump means so as to be supplied with pressurized hydraulic fluid for providing an assisting steering force, means for detecting operation of a vehicle brake means, and control means responsive to an output of the detecting means to actuate said driving means for a predetermined time period to thereby operate the hydraulic pump means.

7. A vehicle power steering system comprising hydraulic pump means, driving means for driving the hydraulic pump means, power cylinder means adapted to be connected with said hydraulic pump means so as to be supplied with pressurized hydraulic fluid for providing an assisting steering force, means for detecting operation of at least one of a vehicle power clutch disconnecting means and a vehicle brake means and producing an operation signal when at least one of said vehicle power clutch disconnecting means and said vehicle brake means is operated, and control means responsive to said operation signal for actuating said driving means when said operation signal is received from said detecting means to thereby operate the hydraulic pump means and for stopping said driving means after a predetermined time after said operation signal is terminated.

* * * * *